US012779485B2

(12) United States Patent
Donaldson

(10) Patent No.: US 12,779,485 B2
(45) Date of Patent: Nov. 3, 2026

(54) SYSTEMS AND METHODS OF FLUID HEATING AND CONTROL

(71) Applicant: Carlisle Fluid Technologies, LLC, Scottsdale, AZ (US)

(72) Inventor: Eric Julius Donaldson, Scottsdale, AZ (US)

(73) Assignee: Carlisle Fluid Technologies, LLC, Scottsdale, AZ (US)

( * ) Notice: Subject to any disclaimer, the term of this patent is extended or adjusted under 35 U.S.C. 154(b) by 503 days.

(21) Appl. No.: 17/799,012

(22) PCT Filed: Feb. 12, 2021

(86) PCT No.: PCT/US2021/017881
§ 371 (c)(1),
(2) Date: Aug. 11, 2022

(87) PCT Pub. No.: WO2021/163505
PCT Pub. Date: Aug. 19, 2021

(65) Prior Publication Data

US 2023/0069163 A1 Mar. 2, 2023

Related U.S. Application Data

(60) Provisional application No. 62/975,749, filed on Feb. 12, 2020.

(51) Int. Cl.

| | |
|---|---|
| ***B05B 12/14*** | (2006.01) |
| ***B05B 7/16*** | (2006.01) |
| ***B29B 7/72*** | (2006.01) |
| ***B29B 7/74*** | (2006.01) |
| ***B29B 7/82*** | (2006.01) |

(Continued)

(52) U.S. Cl.
CPC ........ *B05B 12/1418* (2013.01); *B05B 7/1693* (2013.01); *B29B 7/726* (2013.01); *B29B 7/728* (2013.01); *B29B 7/7438* (2013.01); *B29B 7/823* (2013.01); *B29B 7/826* (2013.01); *F28D 1/0383* (2013.01); *F28F 3/12* (2013.01)

(58) Field of Classification Search
CPC . B05B 12/1418; B05B 7/1693; B05B 7/0018; B05B 7/0408; B29B 7/726; B29B 7/728; B29B 7/7438; B29B 7/823; B29B 7/826; F28D 1/0383; F28F 3/12
See application file for complete search history.

(56) References Cited

U.S. PATENT DOCUMENTS 4,131,395 A * 12/1978 Gusmer ................ F04B 53/164 417/426
9,849,475 B2 * 12/2017 Pellin ...................... B29B 7/826
(Continued)

*Primary Examiner* — Qingzhang Zhou
(74) *Attorney, Agent, or Firm* — Greenberg Traurig, LLP; Michael K. Dixon

(57) ABSTRACT

A multi-component fluid delivery system includes a heater system. The heater system includes an improved fluid preheating system based on a high conductivity fluid heat exchange manifold that is coupled to external heater elements (e.g., powered via electricity). These techniques can provide more surface area for heating fluid and is external to the fluid passages, making service or replacement much easier. These techniques can utilize etched foil or wire wound heater elements that operate at a lower internal temperature than cartridge heaters, and thus can be inherently more reliable.

13 Claims, 9 Drawing Sheets

(51) Int. Cl.
*F28D 1/03* (2006.01)
*F28F 3/12* (2006.01)

(56) References Cited

U.S. PATENT DOCUMENTS

| | | | | |
|---|---|---|---|---|
| 2003/0086701 | A1* | 5/2003 | Motz | G01N 30/12<br>219/544 |
| 2006/0057394 | A1* | 3/2006 | Cork | C08G 18/12<br>428/423.1 |
| 2014/0084025 | A1* | 3/2014 | Tix | B67D 7/82<br>222/626 |
| 2016/0107179 | A1* | 4/2016 | McAndrew | B05B 12/1418<br>239/75 |
| 2019/0022683 | A1* | 1/2019 | Donaldson | F04B 23/04 |

* cited by examiner

SYSTEMS AND METHODS OF FLUID HEATING AND CONTROL

CROSS-REFERENCES TO RELATED APPLICATIONS

This application is a national stage application of International Application No. PCT/US2021/017881, filed 12 Feb. 2021, which application is incorporated herein by reference.

The present application is a continuation and claims the benefit of the filing date of an application entitled, "SYSTEMS AND METHODS FOR FLUID HEATING AND CONTROL," U.S. provisional patent application Ser. No. 62/975,749, filed 12 Feb. 2020, assigned to the assignee of the present application, and herein incorporated by reference.

In multi-component fluid delivery systems, where two or more fluid components or compounds are delivered to an output device or container (e.g. spray gun, mixing chamber, tank, reaction site), a ratio of the fluid component delivery can be used so that process outputs are controlled to intended specifications. An example of desired ratios can be found in two-part Spray Polyurethane Foam (SPF) systems, where the chemistry and mixing process can specify a controlled delivery of two fluid components or compounds (A) and (B) at a 1:1 ratio (by weight or volume). It can be useful to improve heating of the fluid A and/or B.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention can encompass a variety of forms that can be similar to or different from the embodiments set forth below.

BRIEF DESCRIPTION OF THE DRAWINGS

These and other features, aspects, and advantages of the present invention will become better understood when the following detailed description is read with reference to the accompanying drawings in Which like characters represent like parts throughout the drawings, wherein.

DETAILED DESCRIPTION

Figure 1:
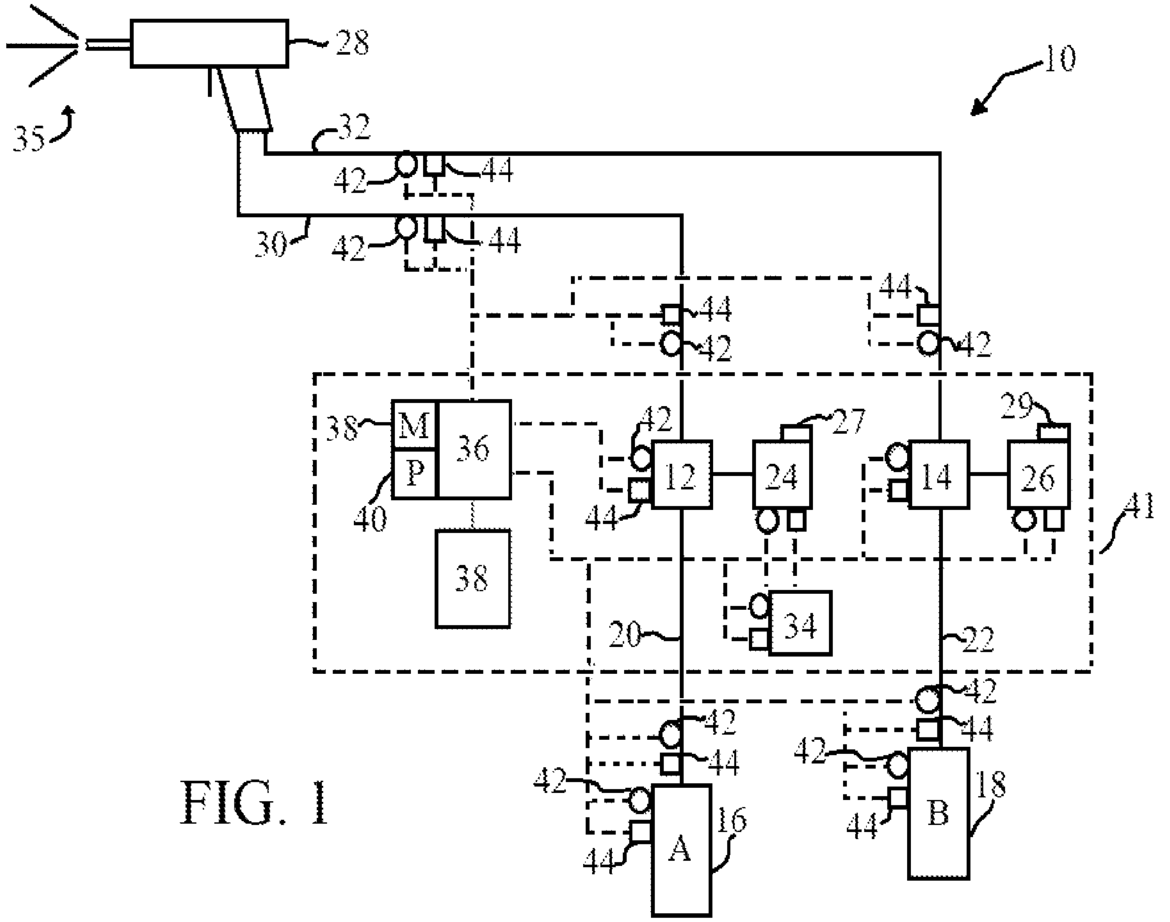
FIG. 1 is block diagram of an embodiment of a spray application system, such as a multi-component fluid delivery system (e.g., SPF system), including a heating system.

One or more specific embodiments of the present invention will be described below. In an effort to provide a concise description of these embodiments, all features of an actual implementation can not be described in the specification. It should be appreciated that in the development of any such actual implementation, as in any engineering or design project, numerous implementation-specific decisions must be made to achieve the developers' specific goals, such as compliance with system-related and business-related constraints, which can vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there can be additional elements other than the listed elements.

Embodiments of the present disclosure are directed to systems and methods that can improve heating for multi-component fluid delivery systems, for example, by preheating certain fluids. In multi-component fluid delivery, multiple components or compounds, such as chemical compounds, can be delivered to an output device or container (e.g. spray gun, mixing chamber, tank, reaction site), at specified temperatures. For example, for two-part Spray Polyurethane Foam (SPF) systems, the chemistry and mixing process can specify a controlled delivery and/or preheating of two fluid components (compound A) and (compound B) at desired temperature or temperatures (e.g., one temperature for A and a second temperature for B). Variations from the desired temperature(s) can result in lower yield (less insulation value per pound of foam) uncured foam, brittle foam, excessive shrinkage, among other issues. It would be beneficial to maintain the compound A and/or compound B at certain temperatures, for example between 50° F.-200° F.

Certain techniques to provide for multiple fluids that can be used in SPF systems can utilize a preheating system for maintaining A and B fluids. In some fluid delivery systems, heating of the fluid can be used to reduce viscous effects that impede material flow. Fluid heating can also be used for more optimum process outcomes. Fluid heating can also be used to better match viscosities between two or more fluids to improve pressure uniformity when the fluids are mixed at a reaction and/or dispensing device. An example of heating is in two-part Spray Polyurethane Foam (SPF) systems, that can employ material heaters for both A and B fluids to reduce viscosities, and viscosity differences, initiate kinetic reactions, and to improve mixing of the materials in the spray gun mix chamber.

Current approaches to preheating of the fluids include: 1) Electric heaters (e.g., cartridge heaters, tubular heaters), inserted in flow passages within a "heat sink) that are in direct contact with the fluids. 2) Cartridge or tubular style heaters that are encased in a high-conductivity heat sink (e.g., aluminum) that contains flow passages, but that are not in direct contact with the fluid. 3) Fluid-to-fluid heat exchangers that use hot coolant from onboard generator engines. 4) Electrical heating cables immersed in fluid hoses or manifolds.

The techniques described herein include an improved fluid preheating system based on a high conductivity fluid heat exchange manifold that is coupled to external heater elements (e.g., powered via electricity). These techniques can provide more surface area for heating fluid and is external to the fluid passages, making service or replacement much easier. These techniques can utilize etched foil or wire wound heater elements that operate at a lower internal temperature than cartridge heaters, and thus can be inherently more reliable.

It can be useful to describe a system that can apply the heating techniques described herein. Accordingly and turning now to FIG. 1, the figure is a block diagram illustrating an embodiment of a spray application system 10 that can include one or more liquid pumps 12, 14. The spray application system 10 can be suitable for mixing and dispensing a variety of chemicals, such as a chemicals used in applying spray foam insulation. In the depicted embodiment, chemical compounds A and B can be stored in tanks 16 and 18, respectively. The tanks 16 and 18 can be fluidly coupled to the pumps 12 and 14 via conduits or hoses 20 and 22. It is to be understood that while the depicted embodiment for the spray application system 10 shows two compounds used for mixing and spraying, other embodiments can use a single compound or 3, 4, 5, 6, 7, 8 or more compounds. The pumps 12 and 14 can be independently controlled. During operations of the spray application system 10, the pumps 12, 14 can be mechanically powered by motors 24, 26, respectively. In a preferred embodiment, the motors can be electric motors. However, internal combustion engines (e.g., diesel engines), pneumatic motors, or a combination thereof. Motor controllers 27 and 29 can be used to provide for motor start/stop, loading, and control based on signals transmitted, for example, from the processor 40. The motor 24 can be of the same type or of a different type from the motor 26. Likewise, the pump 12 can be of the same type or of different type from the pump 14. Indeed, the techniques described herein can be used with multiple pumps 12, 14, and multiple motors 24, 26, which can be of different types.

The pumps 12, 14 provide for hydrodynamic forces suitable for moving the compounds A, B into a spray gun system 28. More specifically, compound A can traverse the pump 12 through conduit 20 and then through a heated conduit 30 into the spray gun system 28. Likewise, compound B can traverse pump 14 through conduit 22 and then through a heated conduit 32 into the spray gun system 28. To heat the heated conduits 30, 32, a heating system 34 can be provided. The heating system 34 can provide for thermal energy suitable for pre-heating the compounds A and B before mixing and spraying and for heating the compounds A and B during mixing and spraying. In certain embodiments, the heating system 34 can include a preheater using laminated thermofoil heating elements on an outside of a fluid manifold (heat exchanger) system. Accordingly, lower temp heaters can be used over larger surface area and flow lengths, as further describe below.

The spray gun system 28 can include a mixing chamber to mix the compounds A and B. For spray foam insulation applications, the compound A can include isocyanates while the compound B can include polyols, flame retardants, blowing agents, amine or metal catalysts, surfactants, and other chemicals. When mixed, an exothermic chemical reaction occurs and a foam 35 is sprayed onto a target. The foam then provides for insulative properties at various thermal resistance (i.e., R-values) based on the chemicals found in the compounds A and B. Control for the spray application system 10 can be provided by a control system 36. The control system 36 can include an industrial controller, and thus include a memory 38 and a processor 40. The processor 40 can include multiple microprocessors, one or more "general-purpose" microprocessors, one or more special-purpose microprocessors, one or more application specific integrated circuits (ARCS), and/or one or more reduced instruction set (RISC) processors, or some combination thereof. The memory 38 can include a volatile memory, such as random access memory (RAM), and/or a nonvolatile memory, such as ROM, a hard drive, a memory card, a memory stick (e.g., USB stick) and so on. The memory 38 can include computer programs or instructions executable by the processor 40 and suitable for controlling the spray application system 10. The memory 38 can further include computer programs or instructions executable by the processor 40 and suitable for detecting pump 12, 14 slip and for providing ratio control actions to continue providing as desired ratio (e.g., 1:1) for compounds A and B era the presence of slip, as further described below.

The control system 36 can be communicatively coupled to one or more sensors 42 and operatively coupled to one or more actuators 44. The sensors 42 can include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 44 can include valves, actuatable switches (e.g., solenoids), positioners, heating elements, and so on.

A user or users can interface with the control system 36 via an input/output (I/O) system 38, which can include touchscreens, displays, keyboards, mice, augmented reality/virtual reality systems, as well as tablets, smartphones, notebooks, and so on. A user can input desired pressures, flow rates, temperatures, ratio between compound A and compound B (e.g. 1:1), alarm thresholds (e.g., threshold fluid levels of compound A, B in tanks 16, 18), and so on. The user can then spray via the spray gun system 28 and the control system 36 can use the processor 40 to execute one or more programs stored in the memory 38 suitable for sensing system 10 conditions via the sensors 42 and for adjusting various parameters of the system 10 via the actuators 44 based on the user inputs. The I/O system 38 can then display several of the sensed conditions as web as the adjusted parameters. Certain components of the spray application system 10 can be included in or interface with a proportioning system 41. The proportioning system 41 can "proportion" or deliver the compounds A, B at a specified ratio (e.g., 1:1) to achieve the spray 35. In this manner, the user(s) can mix and spray chemicals, such as compounds A and B, to provide for certain coatings, such as insulative spray foam.

Figure 2:
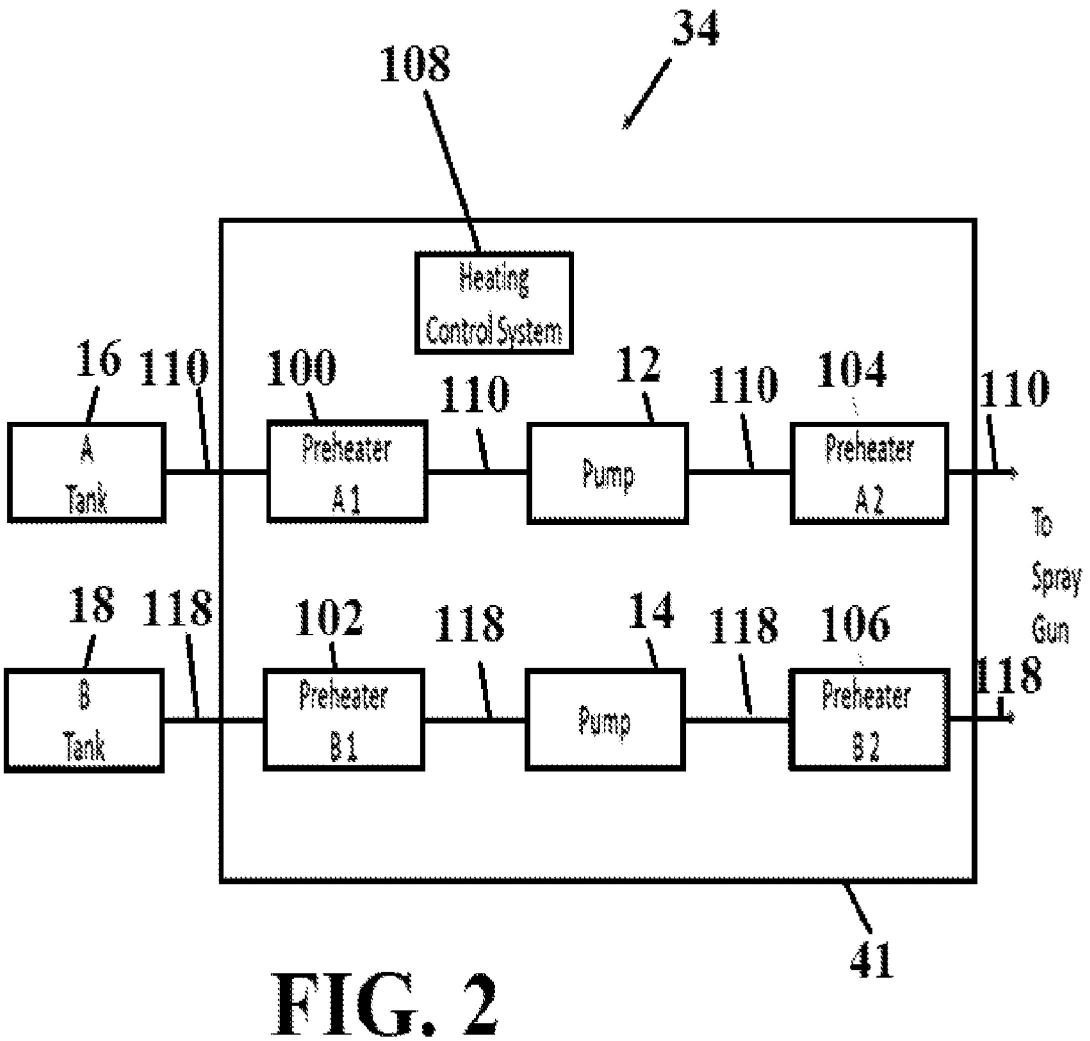
FIG. 2 is block diagram of an embodiment of the heating system included in the spray application system of FIG. 1.

Turning now to FIG. 2, the figure is a block diagram of an embodiment of the heater system 34 included inside of the proportioner system 41. In the illustrated embodiment, the heater system 34 can include preheaters/heat exchangers 100, 102, 104, and 106. In other embodiments, more or less preheaters can be used. For example, preheaters/heat exchangers 100, 102 upstream of the pump (12, 14) can not be used, thus only using preheaters 104, 106. Likewise preheaters 104, 106 downstream of the pump (12, 14) can not be used, thus only using preheaters/heat exchangers 100, 102. A heating control system 108 is also shown, which can be operatively coupled to the preheaters/heat exchangers 100, 102, 104, and/or 106. In some embodiments, the heating control system 108 can be included in the controller system 36. In other embodiments, the heating control system 108 can be separate from the control system 36 and can thus include one or more processors suitable for executing code or instructions and memory suitable for storing the code or instructions. In embodiments where the heating control system 108 is separate from the control system 36, the heating control system 108 can be communicatively and/or operatively coupled to the control system 36. It is also to be understood that in some embodiments, a single pump can be used, suitable for pumping two fluids through two inlets and respective outlets.

During operations, the heating control system 108 can sense temperature via sensors disposed in or on tanks 16, 18, in or on fluid conduit (e.g., hoses) 110, 118, in or on heaters/heat exchangers 100, 102, 104, and 106, and/or in or on pumps 12, 14. The heating control system 108 can then adjust the temperature of the heaters/heat exchangers 100, 102, 104, and/or 106 to maintain a desired temperature profile. For example, the temperature profile can be a ramp up profile, with heat increasing until a plateau is reached and maintained (e.g., between 50° F.-200° F.). Further, the internal wiring of the heaters/heat exchangers 100, 102, 104, and/or 106 can be used as an additional temperature sensor. For example, an electrical resistance (e.g., measured in ohms) of each of the heaters/heat exchangers 100, 102, 104, and/or 106 can provide a measure of temperature. That is, for a given resistance, a temperature can be derived. Accordingly, the resistance of each of heaters/heat exchangers 100, 102, 104, and/or 106 can be used as a redundant sensor. Should the primary sensor fail, the resistance can then be used to heat or as a back up system to turn the heaters/heat exchangers 100, 102, 104, and/or 106 off. The heaters/heat exchangers 100, 102, 104, and/or 106 can provide more surface area for heating fluid and is external to the fluid passages, making service or replacement much easier. The heaters/heat exchangers 100, 102, 104, and/or 106 can utilize etched foil or wire wound heater elements that operate at a lower internal temperature than cartridge heaters, and thus can be inherently more reliable.

Figure 3:
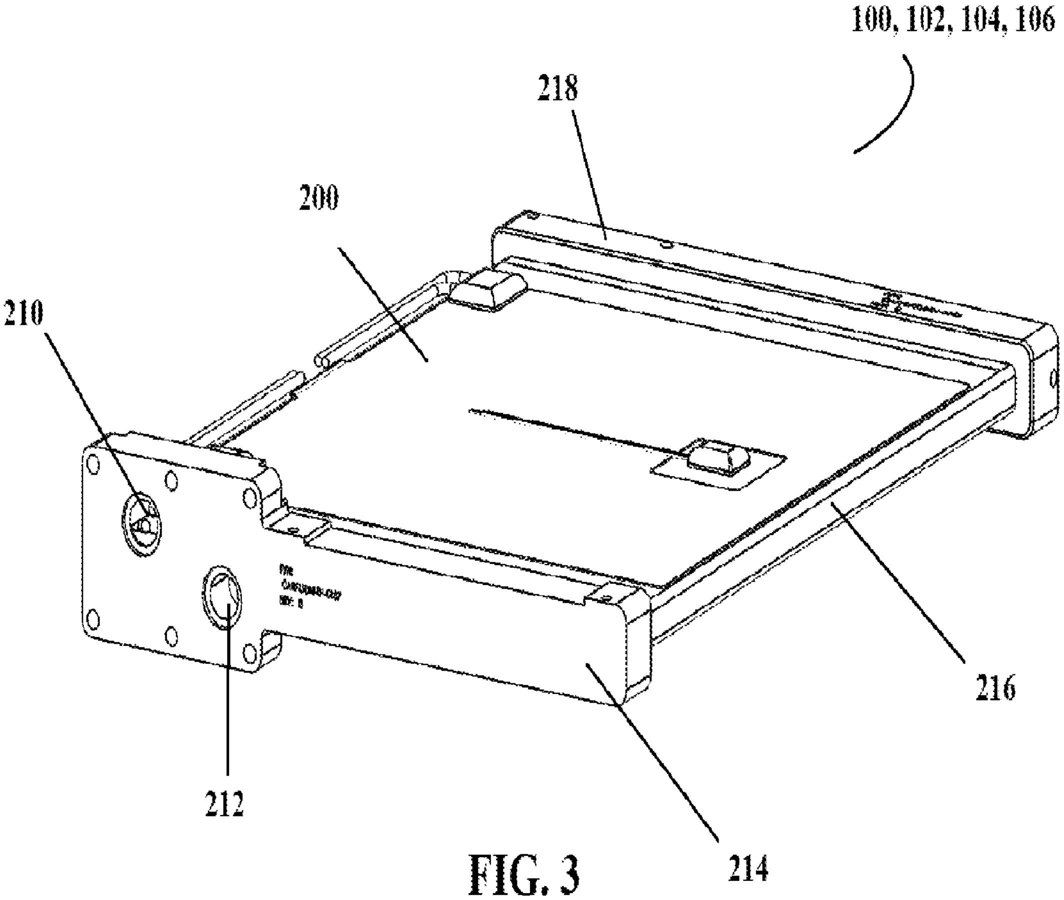
FIG. 3 a perspective view illustrating an embodiment of a heater.

Turning now to FIG. 3, the figure is a perspective view illustrating an embodiment of the heaters/heat exchangers 100, 102, 104, and/or 106. In the illustrated embodiment, the heater includes a top heating element 200 that can utilize etched foil and/or wire wound heater elements. As electrical power is delivered, the heating element 200 can then produce heat which can then heat fluid (e.g., compound A, B) that enters the heater via inlet 210. An outlet 212 is then shown, used to transfer the now heated fluid to another conduit hose) or directly into to another heater 100, 102, 104, and/or 106 in cases where the heaters are "stacked", e.g., disposed on after another in series or in parallel. It is to be noted that inlet and outlet 210, 212 can be switched, that is, that the inlet 210 can become an outlet, and the outlet 212 can then become an inlet. The inlet 210 and outlet 212 are shown disposed on a side member 214, which is fluidly coupled to a manifold member 216. The manifold member 216 is shown as fluidly coupled to a cap member 218. In use, fluid enters inlet 210, traverses through various openings into the manifold member 216, and gets heated via one or more heating element, such as heating element 200. The fluid can then abut against the cap member 218 and return back through other conduits in the manifold member 216 to exit via the outlet 212.

Figure 4:
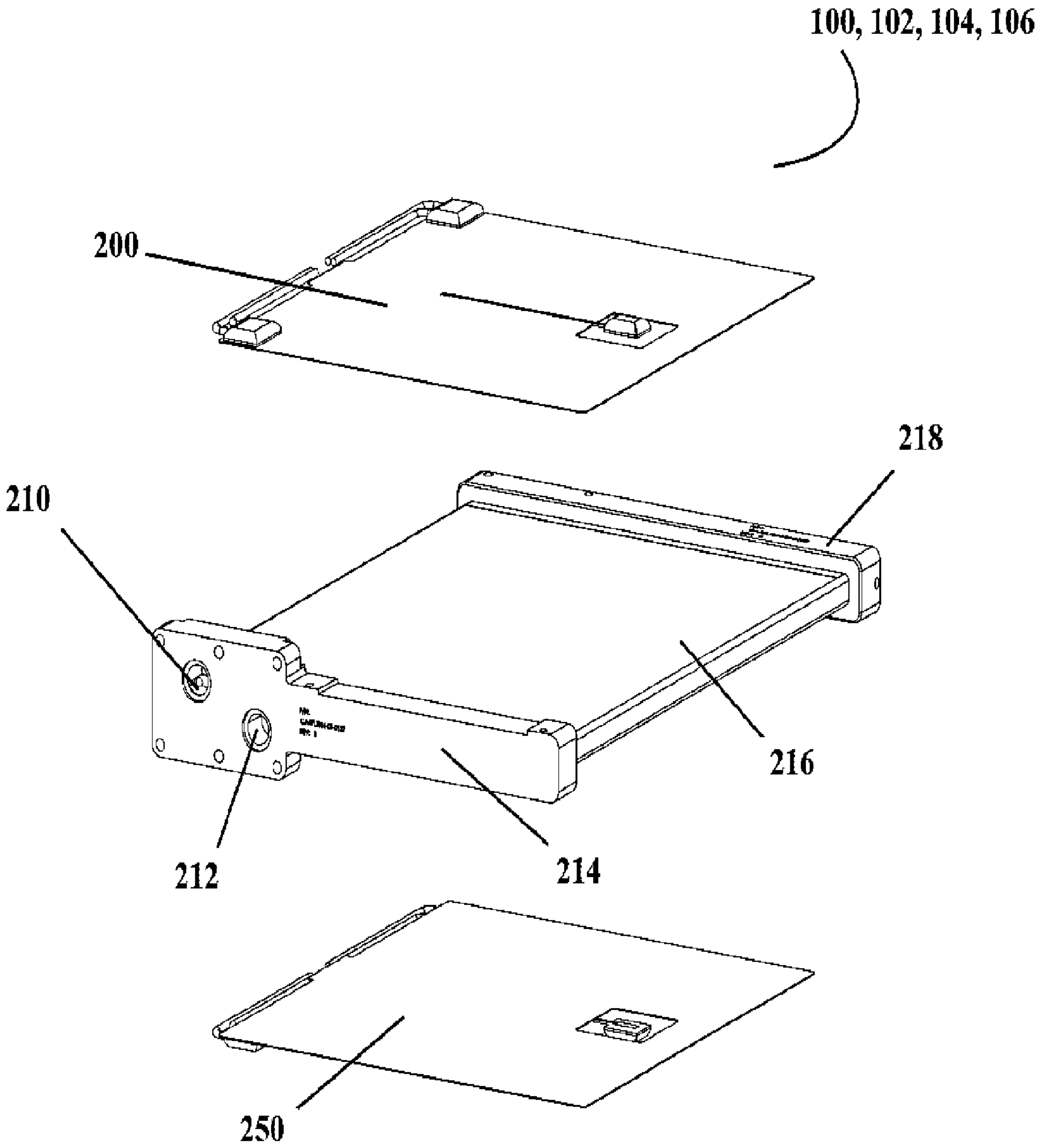
FIG. 4 is an exploded perspective view illustrating an embodiment of a heater.

FIG. 4 is an exploded perspective view illustrating an embodiment of the heaters/heat exchangers 100, 102, 104, and/or 106. Because the figure includes like elements as shown in FIG. 3, the like elements have the same element numbers. As in the previous figure, the illustrated embodiment depicts the heater including the top heating element 200 that can utilize etched foil and/or wire wound heater elements. A bottom heating element 250 is also shown, which can also utilize etched foil and/or wire wound heater elements. In certain embodiments, the heating elements 200, 250 can include a Polyimide Thermofoil™ flexible heater available from Minco, of St. Paul. Minnesota, U.S.A. The heating elements 200, 250 can be heated via techniques such as pulse width modulation (PWM) that turn on and off the heating elements at desired time periods (e.g., time frequencies). The heaters/heat exchangers 100, 102, 104, and/or 106 can thus minimize or eliminates potential for material carbonization, carmelization, build up on heaters or internal surface. The heaters/heat exchangers 100, 102, 104, and/or 106 not require opening of the fluid path to service or replace heaters. The heaters/heat exchangers 100, 102, 104, and/or 106 provide for more accurate thermal control of the fluid due to large area heating and many parallel passages. When the resistive heater elements 200, 250 contain interleaved resistance zones (e.g. a high and low resistance zone in each heater blanket) the total heat output of each heater assembly can be easily adjusted by individually controlling each zone or wiring them in various series/parallel electrical combinations. This allows each heater 100, 102, 104, and/or 106 to be adjusted to match the available input power. The low mass nature of these heater assemblies heaters/heat exchangers 100, 102, 104, and/or 106 can thus allow for more rapid heating and lower warmup times. When used on a low pressure side of a fluid delivery system, the heat sink mass can be significantly reduced to further improve heat transfer rate and reduce warmup time.

The system 10 can include a spray gun 28 configured to spray a mixture of a first component fluid and second component fluid; a first component fluid source 16 configured to supply the first component fluid; a second component fluid source 18 configured to supply the second component fluid; a first heat exchanger 100 configured to supply heat to the first component fluid; and a second heat exchanger 102 configured to supply heat to the second component fluid, wherein the first heat exchanger 100 is configured to supply heat to the first component fluid by providing heat to a first conduit 110, wherein the first conduit 110 is between the first component fluid source 16 and the spray gun 28, wherein the first conduit 110 is in fluid communication with the first component fluid source 16, wherein the system 10 is configured to mix the first component fluid and second component fluid. The system 10 can further provide that the second heat exchanger 102 is configured to supply heat to the second component fluid by providing head to a second conduit 118, wherein the second conduit 118 is between the first component fluid source 16 and the spray gun 28, wherein the second conduit 118 is in fluid communication with the second component fluid source 18. In some embodiments, the system 10 can provide that the first heat exchanger 100 is in thermal communication with the first conduit 110 and mechanically isolated from the fluid component fluid by the first conduit 110, and wherein the second heat exchanger 102 is in thermal communication with the second conduit 118 and mechanically isolated from the second component fluid by the second conduit 118. In some embodiments, the system 10 can provide that the first heat exchanger 100 and second heat exchanger 102 are independently controlled by a control system 36 in some embodiments, the system 10 can provide that the control system 36 is configured to control a first pump 12, 14 and a second pump 12, 14 independently. In some embodiments, the system 10 can provide that the control system 36 is configured to control the first pump 12, 14 by electric communication with a first pump 12, 14 motor controller, wherein the control system 36 is configured to control the second pump 12, 14 by electric communication with a second pump 12, 14 motor controller 29. In some embodiments, the system 10 can provide that the control system 36 is configured to detect a first pump 12, 14 slip and a second pump 12, 14 slip. In some embodiments, the system 10 can provide that the control system 36 is configured to maintain a ratio of the first component fluid and the second component fluid, wherein the ratio of the first component fluid and the second component fluid is preset at a control system 36 interface. In some embodiments, the system 10 can provide that ratio of the first component fluid and the second component fluid can be selectively maintained based on weight or volume. In some embodiments, the system 10 can comprise a third heat exchanger and fourth heat exchanger, wherein the first pump 12 is between the first heat exchanger 100 and third heat exchanger 104 and the second pump 14 is between the second heat exchanger 102 and fourth heat exchanger 106. In some embodiments, the system 10 can provide that the first heat exchanger 100 and second heat exchanger 102 are electric heat exchangers. In some embodiments, the system 10 can provide that the first heat exchanger 100 comprises at least one of an etched foil or wire in thermal communication with at least one first heating element, wherein the second heat exchanger 102 comprises at least one of an etched foil or wire in thermal communication with at least one second heating element. In some embodiments, the system 10 can provide that the first component fluid component comprises an isocyanate, and wherein the second component fluid component comprises at least one of a polyols, a flame retardant, a blowing agent, an amine, a metal catalyst, or a surfactant. The first or any previous or subsequent embodiments can comprise two or more fluid pumps 12, 14, a first component fluid pump 12, 14 of the two or more fluid pumps 12, 14; a second component fluid pump 12, 14 of the two or more fluid pumps 12, 14, wherein the first 12 and the second 14 component fluid pumps are not mechanically coupled to each other; and a control system 36 comprising a processor 40 configured to: derive a slip ratio for the first component fluid pump 12, 14 and the second component fluid pump 12, 14; and apply a master-slave motor control to deliver a specified fluid ratio via the first 12 and the second 14 component fluid pumps based on the slip ratio. In some embodiments, the system 10 can provide that the slip ratio comprises a differential slip ratio having a difference in slip between the first component fluid pump 12, 14 and the second component fluid pump 12, 14. In some embodiments, the system 10 can provide that the processor 40 is configured to derive the slip ratio via an indirect measurement, a direct measurement, or a combination thereof. In some embodiments, the system 10 can provide that the indirect measurement comprises a fluid pressure measurement, and wherein the direct measurement comprises a fluid flow measurement. In some embodiments, the system 10 can provide that the slip ratio comprises a slip volume Q with $Q(t)=PfxFfxjAP^{1/2}dt$ where t comprises a sample time period, Pf=Pump Factor experimentally measured, Ff=Fluid Factor experimentally measured, DR=Po−Pi, Po=Outlet pressure, and Pi=Inlet pressure. In some embodiments, the system 10 can provide that the slip ratio comprises a slip volume Q determined via displacement of the first 12 and the second 14 component fluid pumps at a zero-flow pressurized state. In some embodiments, the system 10 can provide that the processor 40 is configured to apply the master-slave motor control to provide for the same fluid pressure at a first outlet of the first component fluid pump 12, 14 and at a second outlet of the second component fluid pump 12, 14. In some embodiments, the system 10 can provide that the first component fluid pump 12, 14 is configured to be fluidly connected to a foam 35 dispensing gun via a first hose at a first hose inlet of the foam 35 dispensing gun, and wherein the second component fluid pump 12, 14 is configured to be connected to the foam 35 dispensing gun via a second hose at a second hose inlet of the foam 33 dispending gun, and wherein the processor 40 is configured to apply the master-slave motor control to provide for equal fluid pressure between the first and the second hoses, between the first and the second hose inlets, between the first hose and the second hose inlet, between the second hose and the first hose inlet, or a combination thereof. In some embodiments, the system 10 can comprise a first motor controller 27 configured to control the first component fluid pump 12, 14 and a second motor controller 29 configured to control the second component fluid pump 12, 14, wherein the processor 40 is configured to apply the master-slave motor control by selecting one of the first or the second motor controller 29 as a master controller and the other of the first of the second master controller as a slave controller. In some embodiments, the system 10 can provide that the slave motor controller is configured to control a slave velocity of a slave controller motor drive by factoring the slip ratio to a master velocity of a master controller motor drive. In some embodiments, the system 10 can comprise a first pressure sensor 42 disposed on or near a spray gun 28 and configured to monitor the first component fluid; a second pressure sensor 42 disposed on or near the spray gun 28 and configured to monitor a second component fluid; a control system 36 comprising a processor 40 configured to: receive a first signal from the first pressure sensor 42; receive a second signal from the second pressure sensor 42; derive a pressure difference between the first and the second pressure sensor 42 representative of a fluid pressure difference between the first component fluid and the second component fluid; and control one or more pumps 12, 14 based on the pressure difference to obtain a desired pressure difference. In some embodiments, the system 10 can provide that the first pressure sensor 42 is disposed on a inlet of the spray gun 28. In some embodiments, the system 10 can provide that the first pressure sensor 42 is disposed on a hose coupling or on a hose portion of a hose fluidly coupling the one or more pumps 12, 14 to the spray gun 28. In some embodiments, the system 10 can provide that first pressure sensor 42 is disposed on an outlet of the one or more pump 12, 14. In some embodiments, the system 10 can include a first temperature sensor 42 disposed on or near the spray gun 28 and configured to monitor a first temperature of the first component fluid. In some embodiments, the system 10 can provide that the processor 40 is configured to derive the fluid pressure difference by including the first temperature in the derivation. In some embodiments, the system 10 can provide that the processor 40 is configured to apply an ideal gas law when including the first temperature in the derivation. In some embodiments, the system 10 can provide that the processor 40 is configured to heat the first component fluid based on the first temperature to obtain the desired pressure difference. In some embodiments, the system 10 can include a second temperature sensor 42 disposed on or near the spray gun 28 and configured to monitor a second temperature of the second component fluid. In some embodiments, the system 10 can provide that the processor 40 is configured to derive the fluid pressure difference by including the first and the second temperatures in the derivation.

Figure 5:
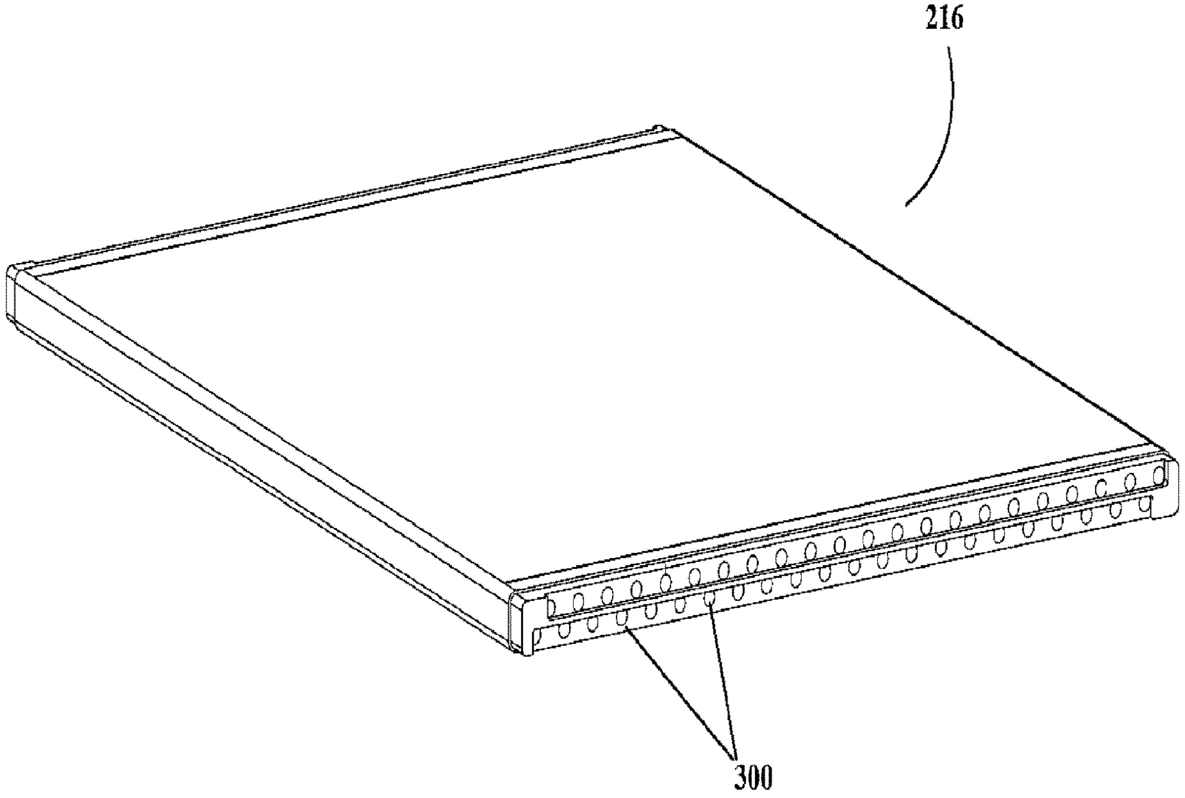
FIG. 5 is a perspective view illustrating further details of an embodiment of the manifold assembly member of heaters in figures above.

FIG. 5 is a perspective view illustrating further details of an embodiment of the manifold assembly member 216. For example, multiple parallel conduits 300 are shown, through which fluid (e.g., compound A or B) can flow through the member 216 to be heated via the heating elements 200, 250. It is also to be noted that heating elements such as elements 200, 250 can be disposed on the sides of the manifold assembly member 216 in addition to the top and bottom of the manifold assembly member 216. It is also to be noted that multiple heating elements can be disposed on the top and bottom of the manifold assembly member 216. That is, the top surface area can include two or more heating elements, the bottom surface area can include two or more heating elements, the sides can each include two more heating elements, and so on. Using multiple heating elements can provide for zone control with multiple zones providing a different temperature to more evenly heat the fluid via the manifold assembly member 216.

Figure 6:
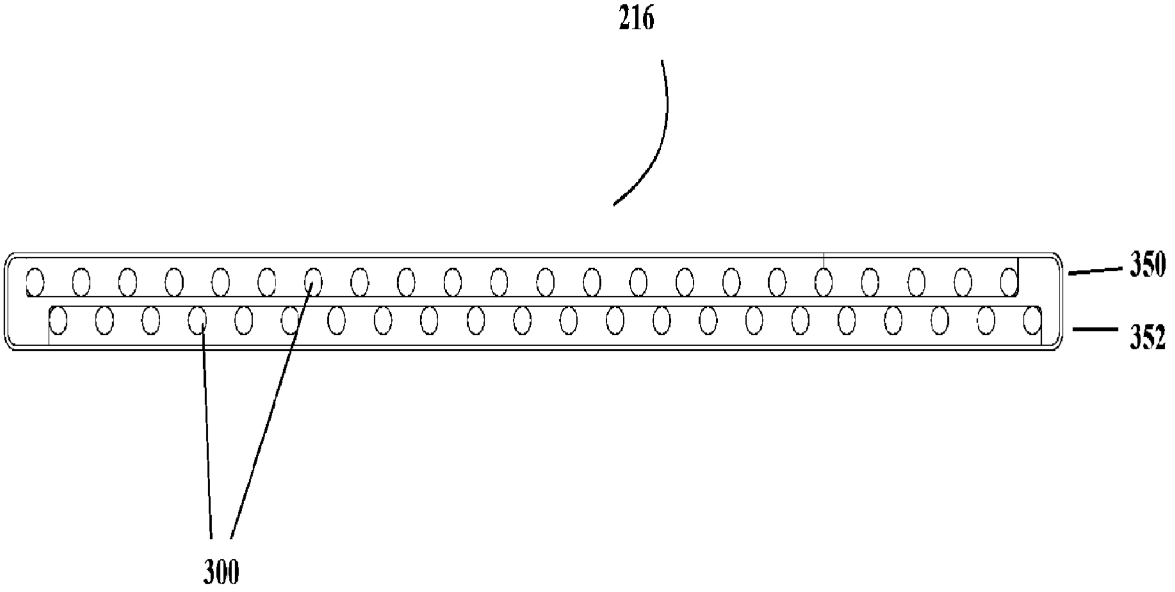
FIG. 6 is a front view of an embodiment of a manifold assembly member showing two rows of the parallel conduits.

FIG. 6 is a front (or rear) view of an embodiment of the manifold assembly member 216 showing two rows of the parallel conduits 300. More specifically, a top row 350 and a bottom row 352 are shown the depicted embodiment, each row includes the same number of openings (e.g., 22 conduits 300). In other embodiments, 3 or more rows, or a single row can be provided, having more than 22 conduits or less than 22 conduits per row. In the depicted embodiment, conduits 300 are parallel with each other and can completely traverse through the manifold assembly member 216. The inlet 210 can be fluidly coupled to the top row 350, and the cap member can include one or more channels to divert the fluid from the top row 350 into the bottom row 352 to exit out of the heaters/heat exchangers 100, 102, 104, and/or 106 via the outlet 212.

Figure 7:
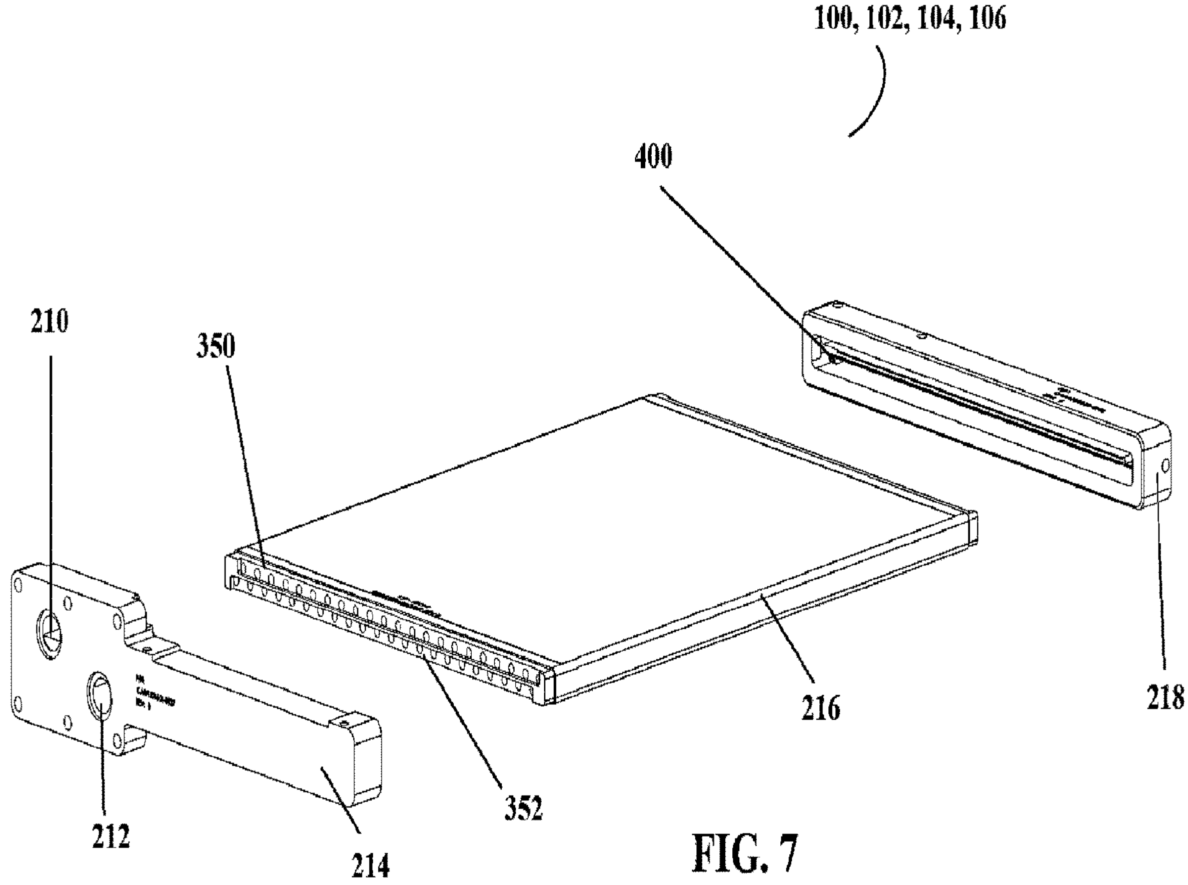
FIG. 7 is an exploded perspective view of an embodiment of a heater showing channel(s) in a cap member.
Figure 8:
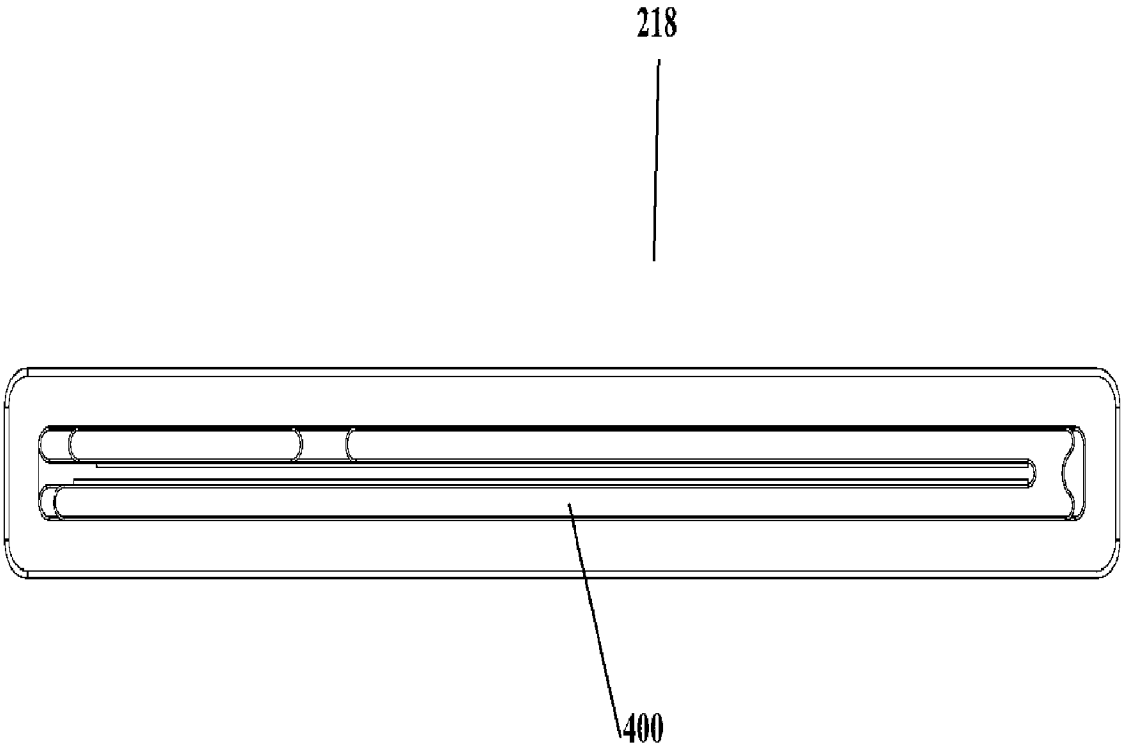
FIG. 8 is a front view that shows an embodiment of the cap member of MG. 7 with further details of a channel.
Figure 9:
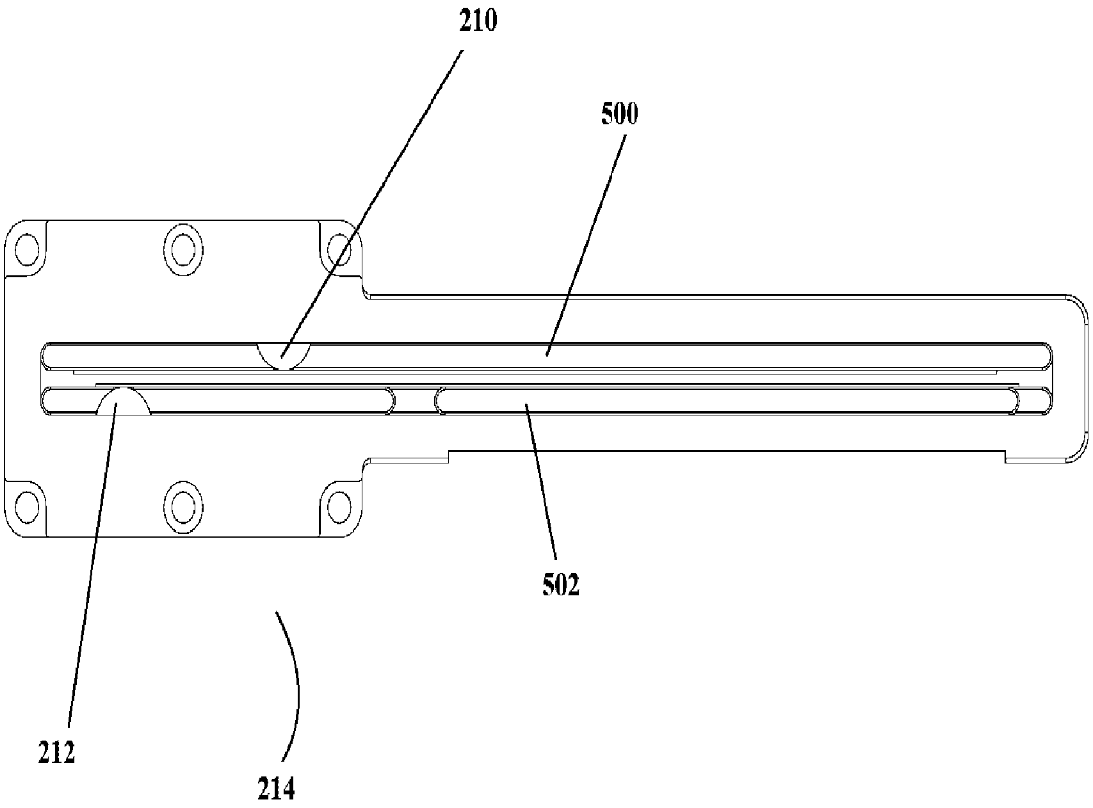
FIG. 9 is a back view that shows an embodiment of a side member showing an inlet and an outlet fluidly coupled to certain channels.

FIG. 7 is an exploded perspective view of an embodiment of the heaters/heat exchangers 100, 102, 104, and/or 106 showing channel(s) 400 in the cap member 218 that can be used to move fluid from the top row 350 conduits into the bottom row 352 conduits. FIG. 8 is a front view that shows an embodiment of the cap member 218 with further details of a channel 400 that can be used to move fluid from top row 350 conduits into the bottom row 352 conduits. FIG. 9 is a back view that shows an embodiment of the member 214 showing inlet 210 fluidly coupled to channel 500 and outlet 212 fluidly coupled to channel 502, Fluid can flow via channel 500 into top row 350 conduits, return via bottom row 352 conduits, enter channel 502 and then enter the outlet 212. Accordingly, manufacturing methods can include manufacturing members 214, 216, 218 with features (e.g., conduits, channels) shown and described. Control processes can include using PID techniques to set a temperature setpoint and then maintain the desired temperature by heating the heating elements, e.g., elements 200, 250.

In a first embodiment, provided is a system, comprising: a spray gun configured to spray a mixture of a first component fluid and second component fluid; a first component fluid source configured to supply the first component fluid; a second component fluid source configured to supply the second component fluid; a first heat exchanger configured to supply heat to the first component fluid; and a second heat exchanger configured to supply heat to the second component fluid, wherein the first heat exchanger is configured to supply heat to the first component fluid by providing heat to a first conduit, wherein the first conduit is between the first component fluid source and the spray gun, wherein the first conduit is in fluid communication with the first component fluid source, wherein the system is configured to mix the first component fluid and second component fluid.

The first embodiment can further provide that the second heat exchanger is configured to supply heat to the second component fluid by providing head to a second conduit, wherein the second conduit is between the first component fluid source and the spray gun, wherein the second conduit is in fluid communication with the second component fluid source.

The first or any previous or subsequent embodiments can further provide that the first heat exchanger is in thermal communication with the first conduit and mechanically isolated from the fluid component fluid by the first conduit, and wherein the second heat exchanger is in thermal communication with the second conduit and mechanically isolated from the second component fluid by the second conduit.

The first or any previous or subsequent embodiments can further provide that the first heat exchanger and second heat exchanger are independently controlled by a control system.

The first or any previous or subsequent embodiments can further provide that the control system is configured to control a first pump and a second pump independently.

The first or any previous or subsequent embodiments can further provide that the control system is configured to control the first pump by electric communication with a first pump motor controller, wherein the control system is configured to control the second pump by electric communication with a second pump motor controller.

The first or any previous or subsequent embodiments can further provide that the control system is configured to detect a first pump slip and a second pump slip.

The first or any previous or subsequent embodiments can further provide that the control system is configured to maintain a ratio of the first component fluid and the second component fluid, wherein the ratio of the first component fluid and the second component fluid is preset at a control system interface. The first or any previous or subsequent embodiments can further provide that ratio of the first component fluid and the second component fluid can be selectively maintained based on weight or volume.

The first or any previous or subsequent embodiments can further comprise a third heat exchanger and fourth heat exchanger, wherein the first pump is between the first and third heat exchanger and the second pump is between the second and fourth heat exchanger.

The first or any previous or subsequent embodiments can further provide that the first heat exchanger and second heat exchanger are electric heat exchangers.

The first or any previous or subsequent embodiments can further provide that the first heat exchanger comprises at least one of an etched foil or wire in thermal communication with at least one first heating element, wherein the second heat exchanger comprises at least one of an etched foil or wire in thermal communication with at least one second heating element.

The first or any previous or subsequent embodiments can further provide that the first component fluid component comprises an isocyanate, and wherein the second component fluid component comprises at least one of a polyols, a flame retardant, a blowing agent, an amine, a metal catalyst, or a surfactant.

The first or any previous or subsequent embodiments can comprise two or more fluid pumps, a first component fluid pump of the two or more fluid pumps; a second component fluid pump of the two or more fluid pumps, wherein the first and the second component fluid pumps are not mechanically coupled to each other; and a control system comprising a processor configured to: derive a slip ratio for the first component fluid pump and the second component fluid pump; and apply a master-slave motor control to deliver a specified fluid ratio via the first and the second component fluid pumps based on the slip ratio. The first or any previous or subsequent embodiments can further provide that the slip ratio comprises a differential slip ratio having a difference in slip between the first component fluid pump and the second component fluid pump.

The first or any previous or subsequent embodiments can further provide that the processor is configured to derive the slip ratio via an indirect measurement, a direct measurement, or a combination thereof.

The first or any previous or subsequent embodiments can further provide that the indirect measurement comprises a fluid pressure measurement, and Wherein the direct measurement comprises a fluid flow measurement.

The first or any previous or subsequent embodiments can further provide that the slip ratio comprises a slip volume Q with Q(t)=Pfx Ff}DR$^{1/2}$dt where t comprises a sample time period, Pf=Pump Factor experimentally measured, Ff=Fluid Factor experimentally measured, DR=Po−Pi, Po=Outlet pressure, and Pi=Inlet pressure.

The first or any previous or subsequent embodiments can further provide that the slip ratio comprises a slip volume Q determined via displacement of the first and the second component fluid pumps at a zero-flow pressurized state.

The first or any previous or subsequent embodiments can further provide that the processor is configured to apply the master-slave motor control to provide for the same fluid pressure at a first outlet of the first component fluid pump and at a second outlet of the second component fluid pump.

The first or any previous or subsequent embodiments can further provide that the first component fluid pump is configured to be fluidly connected to a foam dispensing gun via a first hose at a first hose inlet of the foam dispensing gun, and wherein the second component fluid pump is configured to be connected to the foam dispensing gun via a second hose at a second hose inlet of the foam depending gun, and wherein the processor is configured to apply the master-slave motor control to provide for equal fluid pressure between the first and the second hoses, between the first and the second hose inlets, between the first hose and the second hose inlet, between the second hose and the first hose inlet, or a combination thereof.

The first or any previous or subsequent embodiments can further comprise a first motor controller configured to control the first component fluid pump and a second motor controller configured to control the second component fluid pump, wherein the processor is configured to apply the master-slave motor control by selecting one of the first or the second motor controller as a master controller and the other of the first of the second master controller as a slave controller.

The first or any previous or subsequent embodiments can further provide that the slave motor controller is configured to control a slave velocity of a slave controller motor drive by factoring the slip ratio to a master velocity of a master controller motor drive.

The first or any previous or subsequent embodiments can further comprise a first pressure sensor disposed on or near a spray gun and configured to monitor the first component fluid; a second pressure sensor disposed on or near the spray gun and configured to monitor a second component fluid; a control system comprising a processor configured to: receive a first signal from the first pressure sensor; receive a second signal from the second pressure sensor; derive a pressure difference between the first and the second pressure sensor representative of a fluid pressure difference between the first component fluid and the second component fluid; and control one or more pumps based on the pressure difference to obtain a desired pressure difference.

The first or any previous or subsequent embodiments can further provide that the first pressure sensor is disposed on a inlet of the spray gun.

The first or any previous or subsequent embodiments can further provide that the first pressure sensor is disposed on a hose coupling or on a hose portion of a hose fluidly coupling the one or more pumps to the spray gun.

The first or any previous or subsequent embodiments can further provide that first pressure sensor is disposed on an outlet of the one or ore pumps. The first or any previous or subsequent embodiments can further include a first temperature sensor disposed on or near the spray gun and configured to monitor a first temperature of the first component fluid.

The first or any previous or subsequent embodiments can further provide that the processor is configured to derive the fluid pressure difference by including the first temperature in the derivation.

The first or any previous or subsequent embodiments can further provide that the processor is configured to apply an ideal gas law when including the first temperature in the derivation.

The first or any previous or subsequent embodiments can further provide that the processor is configured to heat the first component fluid based on the first temperature to obtain the desired pressure difference.

The first or any previous or subsequent embodiments can further include a second temperature sensor disposed on or near the spray gun and configured to monitor a second temperature of the second component fluid.

The first or any previous or subsequent embodiments can further provide that the processor is configured to derive the fluid pressure difference by including the first and the second temperatures in the derivation.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A system, comprising:

a spray gun configured to spray a mixture of a first component fluid and second component fluid;

a first component fluid source configured to supply the first component fluid;

a second fluid source configured to supply the second component fluid;

a first heat exchanger configured to supply heat to the first component fluid, wherein the first heat exchanger comprises an electric heating element coupled to a manifold;

a second heat exchanger configured to supply heat to the second component fluid, wherein the first heat exchanger is configured to supply heat to the first component fluid by providing heat to a first conduit, wherein the first conduit is between the first component fluid source and the spray gun, wherein the first conduit is in fluid communication with the first component fluid source, wherein the system is configured to mix the first component fluid and second component fluid; and wherein the manifold to which the first heat exchanger is coupled comprises a first row of at least one conduit configured to receive the first component fluid flowing in a first direction and a second row of at least one conduit flowing in a second direction forming a countercurrent flow of the first component fluid in the manifold.

2. The system of claim 1, wherein the second heat exchanger is configured to supply heat to the second component fluid by providing heat to a second conduit, wherein the second conduit is between the second component fluid source and the spray gun, wherein the second conduit is in fluid communication with the second fluid source.

3. The system of claim 2, wherein the first heat exchanger is in thermal communication with the first conduit and mechanically isolated from the first component fluid by the first conduit, and wherein the second heat exchanger is in thermal communication with the second conduit and mechanically isolated from the second component fluid by the second conduit.

4. The system of claim 2, wherein the first heat exchanger and second heat exchanger are independently controlled by a control system.

5. The system of claim 4, wherein the control system is configured to control a first pump and a second pump independently.

6. The system of claim 5, wherein the control system is configured to control the first pump by electric communication with a first pump motor controller, wherein the control system is configured to control the second pump by electric communication with a second pump motor controller.

7. The system of claim 5, wherein the control system is configured to detect a first pump slip and a second pump slip.

8. The system of claim 7, wherein the control system is configured to maintain a ratio of the first component fluid and the second component fluid, wherein the ratio of the first component fluid and the second component fluid is preset at a control system interface.

9. The system of claim 8, wherein ratio of the first component fluid and the second component fluid can be selectively maintained based on weight or volume.

10. The system of claim 5, further comprising a third heat exchanger and fourth heat exchanger, wherein the first pump is between the first and third heat exchanger and the second pump is between the second and fourth heat exchanger.

11. The system of claim 2, wherein the first heat exchanger and second heat exchanger are electric heat exchangers.

12. The system of claim 11, wherein the first heat exchanger comprises at least one of an etched foil or wire in thermal communication with at least one first heating element, wherein the second heat exchanger comprises at least one of an etched foil or wire in thermal communication with at least one second heating element.

13. The system of claim 2, wherein the first component fluid comprises an isocyanate, and wherein the second fluid component comprises at least one of a polyols, a flame retardant, a blowing agent, an amine, a metal catalyst, or a surfactant.

* * * * *